United States Patent [19]

Killian

[11] Patent Number: 4,863,188
[45] Date of Patent: Sep. 5, 1989

[54] WHEEL SUSPENSION FOR STEERED WHEELS OF MOTOR VEHICLES

[75] Inventor: Friedrich Killian, Hitzhofen, Fed. Rep. of Germany

[73] Assignee: Audi AG, Fed. Rep. of Germany

[21] Appl. No.: 188,935

[22] Filed: May 2, 1988

[30] Foreign Application Priority Data

May 2, 1987 [DE] Fed. Rep. of Germany ....... 3714688

[51] Int. Cl.$^4$ .............................................. B62D 7/00
[52] U.S. Cl. .................................................... 280/675
[58] Field of Search ................ 280/673, 674, 675, 771

[56] References Cited

U.S. PATENT DOCUMENTS

| | | | |
|---|---|---|---|
| 4,522,418 | 6/1985 | Struck et al. | 280/675 |
| 4,589,677 | 5/1981 | Matschinsky | 280/675 |
| 4,657,271 | 4/1987 | Salmon | 280/675 |
| 4,706,989 | 11/1987 | Iijima et al. | 280/675 |
| 4,738,458 | 4/1988 | Warner | 280/675 |

Primary Examiner—Richard A. Bertsch
Attorney, Agent, or Firm—Lalos & Keegan

[57] ABSTRACT

In a wheel suspension for steered wheels of motor vehicles, having a pivoting wheel carrier, which has a lower suspension elements, two suspension arms which extend to converge toward the wheel carrier the suspension spring of the motor vehicle is supported at one of the suspension arms in such a way that a transverse component of force effects a steering return at this arm. In this connection, the steering geometry is designed in such a way that multiplied by the lever arm between the point of articulation of the suspension arm at the wheel carrier and the idealized steering axis formed by the extension of the suspension arms this transverse component of force assumes a smaller value for a steering angle on the inside of the bend than for a steering angle on the outside of the bend.

7 Claims, 3 Drawing Sheets

WHEEL SUSPENSION FOR STEERED WHEELS OF MOTOR VEHICLES

BACKGROUND AND DISCUSSION OF THE INVENTION

The invention relates to a wheel suspension for steered wheels of motor vehicles. The suspension system of the invention is connected to the wheel carrier by first and second lower suspension arms connected to converge toward the wheel carrier from spaced positions on the vehicle body. A shock absorber and spring are arranged between the body and the wheel suspension wherein the spring is supported on at least one of the suspension arms to produce a transverse component of force through the intersection of the spring strut and the arm to which it is attached. The features of the system are such that this force is multiplied by a lever arm between the point of articulation of suspension arm at the wheel carrier and the idealized steering axis formed by the extension of the suspension arms. The proportionate transverse element of force assumes a lower value for a steering angle on the inside curve than for a steering angle on the outside of the curve.

In this connection, a transverse link having a point of articulation on the wheel carrier, a telescopic shock absorber designed as an integral part of the wheel carrier, or, equally, a combination of two individual suspension arms can serve as upper wheel suspension element. The advantage of individual suspension arms of this type lies particularly in the definition of an ideal steering axis, which can, if necessary, be realized independently of design constraints.

In attempting to ensure a kinematic behavior of the wheel suspension that is as favorable as possible, the designer may consider the wheel camber, the caster, spring action and the damping and roll behavior, and the steering return as only a few of the parameters. To create a reliable wheel suspension of simple design, the designer is mostly forced into compromises. With regard to driven wheels of the wheel suspension the steering return can be especially problematical in this connection because of drive effects and of the free play of the cardan shafts (drive shafts).

It is an object of the invention to create a wheel suspension having the features discussed above, without extra constructional expenses and without the impairment of other axial kinematic parameters, to ensure a reliable steering return and an improved free play of the cardan shafts for driven wheels.

In accordance with the invention, it is proposed to support the suspension springs at one of the lower suspension arms in such a way that the spring exerts a transverse component of force which sets a steering angle. In the straight-ahead driving position of the wheels, this transverse component of force is compensated by the steering assembly via the transverse component of force at the opposite wheel suspension. Because of the geometrical design of the suspension arm, however, when a bend is being taken the transverse component of force or the resultant aligning torque at the wheel on the outside of the bend is greater than the oppositely directed torque on the wheel at the inside of the bend, so that a resultant aligning torque is exerted on the wheels or the steering assembly. The spring utilized for this purpose preferably can be a helical compression spring or a pneumatic spring.

The more specific design features which enhance the ability to achieve the above objectives include the location of various articulation points with regard to the wheel carrier and other elements of the vehicle. Specifically, the lower end of the spring is connected to the first arm at a position between the articulation point with the wheel and its articulating point with the body. The upper end of the spring strut is connected between the articulation points for the lower suspension elements where they are connected to the body and preferably adjacent to the straight line connecting these points. The spring is aligned substantially parallel to the axis of rotation for the wheel when the vehicle is in a straight-ahead driving position. A line of symmetry is defined between the first and second suspension arms which is inclined toward to the rear of the vehicle at an angle of about 15°. Similarly, the straight line connecting points of articulation of the suspension arms on the side of the wheel carrier forms an obtuse angle with this line of symmetry. A connecting straight line of the points of articulation for the suspension arms with the vehicle body is inclined inwards in the driving direction at about 15° to the longitudinal axis of the vehicle. Furthermore, the first suspension arm is arranged to be inclined upwards and backwards at an angle in relation to the transverse plane through the vehicle or to the wheel axis. The spring strut is formed from a telescopic shock absorber and a spring which grips the suspension arm.

This design is particularly favorable for the spring, especially a spring strut composed of telescopic shock absorber and spring, to grip at the forward suspension arm, and for the support of the spring strut on the body side to lie between the suspension arms. The supporting points of the spring strut or the straight line connecting them can be aligned approximately transverse to the longitudinal axis of the vehicle or parallel to the wheel axis in the straight-ahead driving position, whereby the transverse component of force at the suspension arm assumes a favorable value.

Other features produce a further improvement in the steering return and, for driven wheels, in the free play between spring strut and cardan shaft.

Firstly, because of the arrangement of the suspension arms that has been described, there is a favorable influence on the measure "a" which defines the lever arm of the disturbing force in the region of the wheel axis. The measure "a" is therefore the distance between the steering axis and the vertical plane through the center of the wheel at the level of the wheel axis. If the measure "a" is designed so that it takes the value 0 or nearly 0 in the straight-ahead driving position of the vehicle, then because of the features according to the invention the result is that the measure "a" is smaller for a lock on the outside than on the inside of the bend. For driven wheels and a corresponding drive torque during acceleration), this causes an aligning torque at the steering assembly, which results from the propelling forces.

It is further achieved by this suspension arm arrangement that when a lock is applied to the wheel the front suspension arm and the cardan shaft are always deflected in the same direction (forwards or backwards in the plan view). Since the spring or the spring strut is supported at this suspension arm, the lower section of the spring is moved correspondingly at the same time. In this way, the separation between spring or spring strut and cardan shaft remains essentially the same in the straight-ahead driving position and when a wheel lock is applied, so that no problems arise concerning the free play.

The above has been a brief description of some deficiencies in the prior art and advantages of the invention. Further advantages can be perceived from the detailed discussion of preferred embodiment which follows.

DETAILED DISCUSSION OF THE PREFERRED EMBODIMENT

Figure 1:
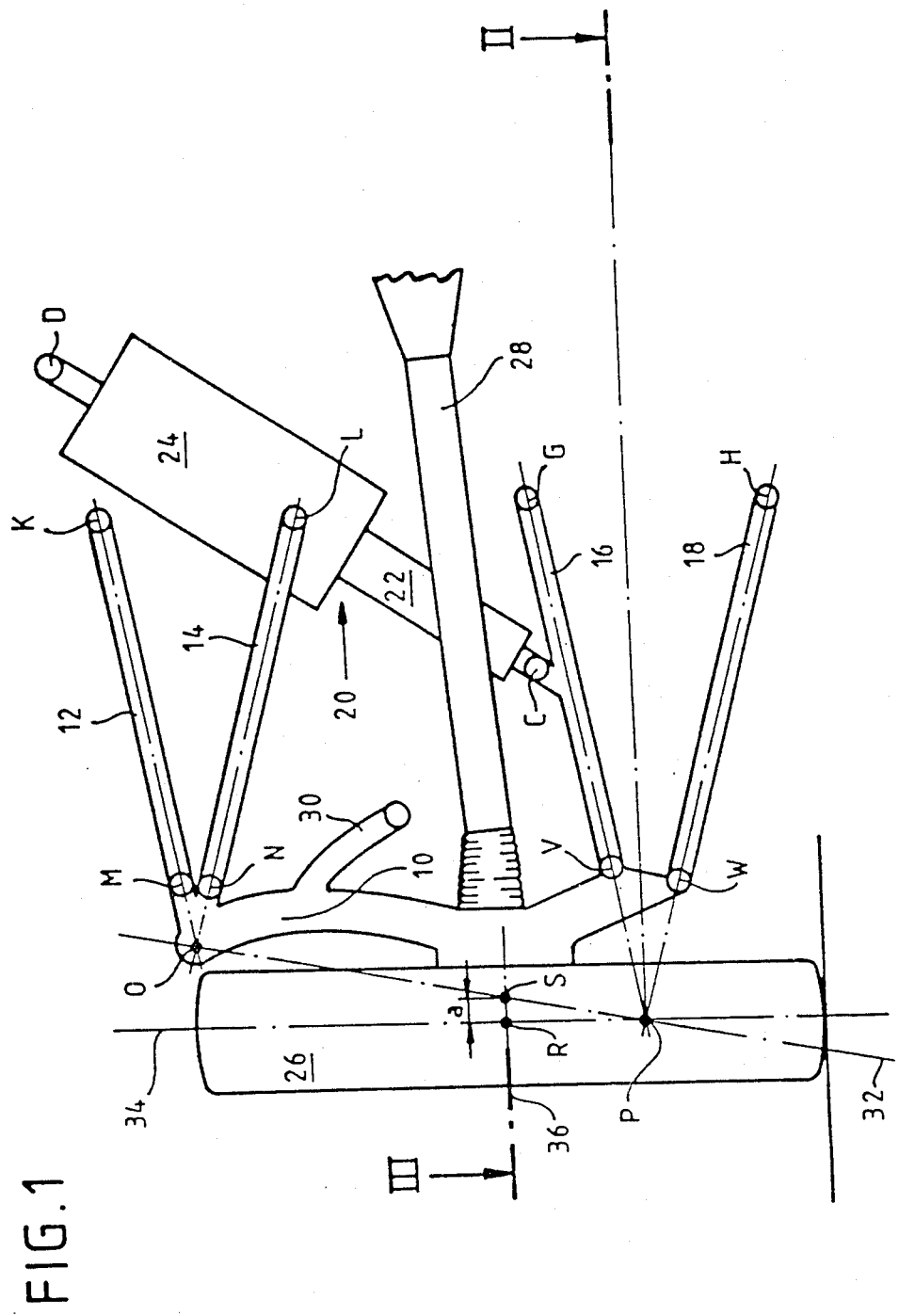
FIG. 1 shows a wheel suspension for steered, driven wheels of a motor vehicle, having two lower individual suspension arms and a spring strut, in a view as seen from the rear of the vehicle.

The wheel suspension shown has a wheel carrier 10, which is guided on two upper suspension arms 12, 14 and on two lower suspension arms 16, 18. The suspension arms which are in each case independent of each other, are connected via elastic joints to the wheel carrier 10 or to the body (not represented) of the motor vehicle at the points G, H, V, W (lower suspension arms 16, 18) or K, L, M, N (upper suspension arms 12, 14).

On the lower suspension arm 16, which is located at the front in the driving direction, a spring strut 20, composed of a telescopic shock absorber 22 and a helical compression spring 24, is supported at the point C near the wheel carrier 10. The supporting point of the spring strut 20 is defined with D on the body side and, seen in the plan view, is located near the connecting straight line of the points of articulation G and H.

The motor vehicle wheel 26, which is mounted so as to rotate in the wheel carrier 10, is driven via a cardan shaft 28 by a power unit that is not shown. Further, molded onto the wheel carrier 10 is a steering lever 30, which is connected in a known way with a track rod (not represented) of the vehicle steering assembly.

The idealized pivoting points O, P of the wheel 26, which result from the imaginary extension of the suspension arms 12, 14, and 16, 18 define a steering axis 32. The lever arm of the disturbing force is formed by the separation between the plane through the center of the wheel (line 34) and the steering axis 32 in the wheel axis 36 (points of intersection R and S).

Figure 2:
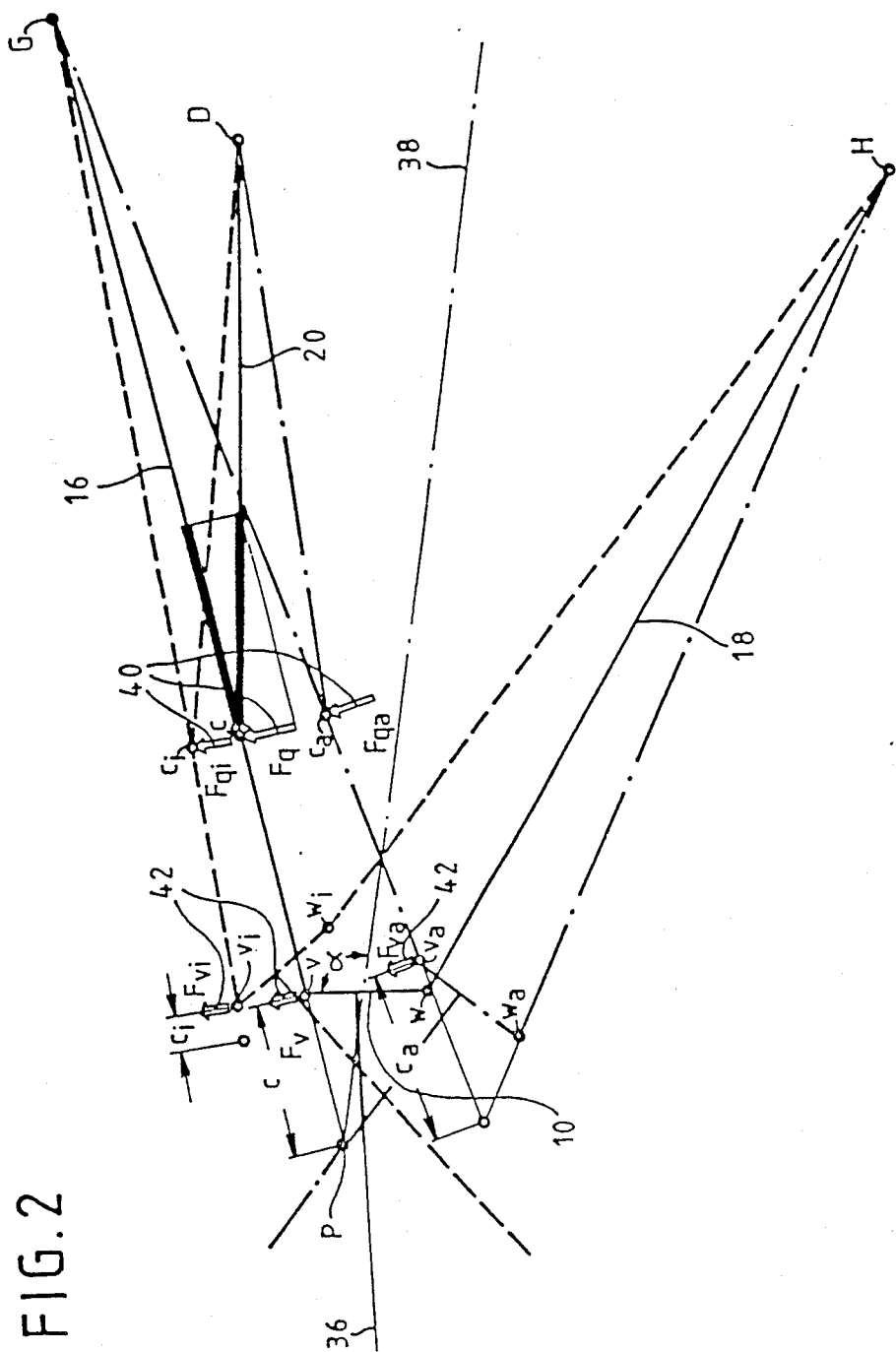
FIG. 2 a plan view, in the plane II—II of FIG. 1, of the lower suspension arm or of its geometrical arrangement, showing the aligning forces exercised by the spring force.

FIG. 2 shows the lower suspension arms 16, 18 in their geometrical position in straight-ahead driving position (continuous lines), for a wheel lock on the inside of the bend (dashed lines), and for a wheel lock on the outside of the bend (dashed and dotted lines). In the straight-ahead driving position the front suspension arm 16 is inclined outwards by an angle of about 15° at the back in relation to the vertical transverse plane through the vehicle. The back suspension arm 18 runs outwards at the front at an angle of about 45° (at the back and front in relation to the regular driving direction of the motor vehicle). This results in a line of symmetry 38 of the suspension arms 16, 18, which corresponds to an angle of about 15° outwards at the front in relation to the transverse plane through the vehicle or to the wheel axis 36. In this connection, the body-side points of articulation G and H, or their connecting straight line, lie inside to the front at an angle of about 15° to a longitudinal axis of the vehicle, while on the wheel carrier side the points of articulation V and W, or their connecting straight line, enclose an obtuse angle of about 100° to the line of symmetry 38.

Owing to this geometrical arrangement, the spring strut 20, which grips at the supporting points C and D, the connecting straight line of the supporting points C and D running approximately parallel to the wheel axis 36 in the plan view, produces a transverse component of force $F_q$ (arrow 40), which in reaction produces on the wheel carrier side at the point of articulation V of the suspension arm 16 a steering torque ($F_v \times C$), acting around the pivoting point P of the wheel with a lever length C. Since the wheel carrier 10 is connected via its steering lever 30 and the remaining steering assembly (not represented) with the identical wheel suspension in mirror image (see FIG. 3), this steering torque is compensated by the oppositely directed steering torque of the right-hand wheel suspension.

Comparing, now, the lever length C, with which the proportionate transverse component of force $F_v$ of the spring strut 20 acts on the pivoting axis P via the pivoting point V, with the lever length $C_i$ for a lock on the inside of the bend, and with the lever length $C_a$, for a lock on the outside of the bend it is found that for a lock on the inside of the bend the lever length $C_i$ is greatly reduced. This means that when a bend is taken a predominant steering torque is present at the left hand or right hand wheel suspension, as the case may be, because of the greater lever length $C_a$, and because of the direction of grip (see arrows 42), this torque produces a steering return.

Figure 3:
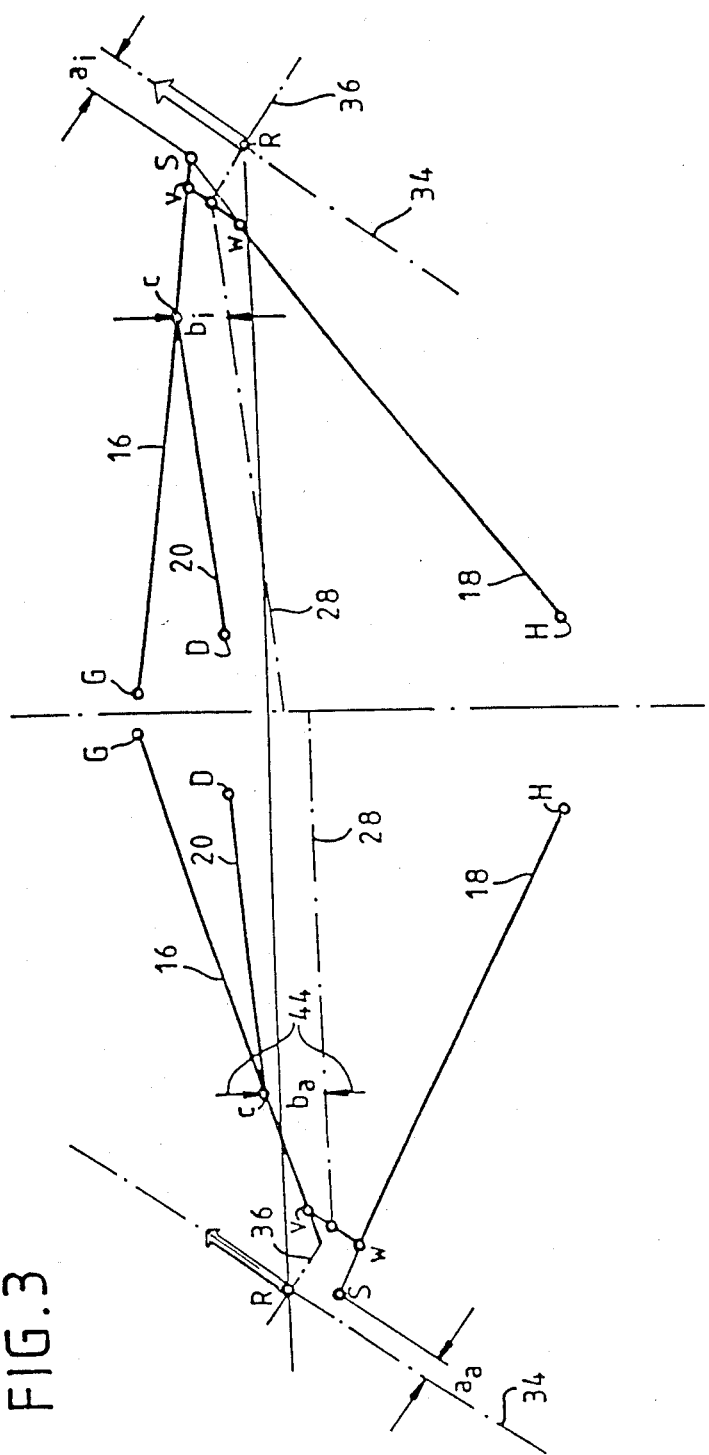
FIG. 3 a plan view, in the plane III—III of FIG. 1, of the lower suspension arm or of its geometrical arrangement, with a representation of the free play for the cardan shaft and of the aligning propulsive force due to the different measure.

Further, as FIG. 3 shows, a different measure also arises, being greater for a steering angle on the inside of the bend (right hand wheel suspension) than for a steering angle on the outside of the bend (left hand wheel suspension). As a result, the lever arm of the disturbing force on the inside of the bend $a_i$ is in each case greater than that on the outside of the bend $a_a$, and when the motor vehicle accelerates out of the bend a steering torque resulting from the propelling force arises at the wheel on the inside of the bend and effects a steering return.

Moreover, the geometrical arrangement of the suspension arm 16 and the spring strut 20 (see points of articulation G, V supporting points C, D), ensures that when a lock is applied the separation b (double arrow 44) between the cardan shaft 28 and the spring strut 20 remains essentially the same (see separation $b_a$ for a steering angle on the outside of the bend and $b_i$ for a steering angle on the inside of the bend). When the vehicle wheels are in the straight-ahead driving position the measure is almost 0 (not visible in the drawing).

The above has been a detailed discussion of the preferred embodiment. The full scope of the invention is defined in the claims which follow and their equivalents. However, the discussion of preferred embodiment should not be interpreted to unduly limit the invention to which applicant is entitled.

What is claimed is:

1. Wheel suspension apparatus for steered wheels of motor vehicles, comprising: a motor vehicle body, a pivoting wheel carrier guided on upper and lower suspension elements connected to said carrier, first and second suspension arms forming said lower suspension elements and extending to converge toward said wheel carrier, said first and second suspension arms are connected separately to the body of the motor vehicle and to said wheel carrier, a shock absorber connected to said body, a spring arranged between the body and wheel suspension, wherein said spring is supported at one of said suspension arms to produce a transverse component of force arising at said arm, said first arm being connected to said wheel carrier for pivotal movement therewith at a first wheel articulation point, said first arm having a first longitudinal axis and said second arm having a second longitudinal axis; an idealized steering axis formed by the intersection of the longitudinal axis of said first and second lower suspension arms; a moment arm defined by the distance between said steering axis and said point of articulation; said arms cooperating with said wheel carrier to provide a transverse element of force when acting on said moment arm to have a lower value multiplied by the lever arm for a steering angle on the inside of the curve than for a steering angle on the outside of the curve.

2. Wheel suspension apparatus according to claim 1, wherein said vehicle has a driving direction said first arm being connected to said body for pivotal movement therewith at first body articulation point in the driving direction, said second arm being connected to said body for pivotal movement therewith at a second body articulation point space from said first body articulation point rearward of said driving direction; said spring having an upper end and a lower end, said lower end connected to said first arm at a position between said first body articulation point and said first wheel articulation point; and said upper end connected to said body between the points of articulation of said first and second arms.

3. Wheel suspension apparatus according to claim 1 wherein said wheel defines an axis of rotation, said upper end and said lower end of said spring are aligned substantially parallel to said wheel axis in said driving direction.

4. Wheel suspension apparatus according to claim 1, wherein each arms define its respective first and second suspension axis; said first and second axes define therebetween a line of symmetry inclined inwards toward the rear of the vehicle at an angle of about 15° to said wheel axis; a connecting straight line of said first and second wheel articulation points forms an obtuse angle with said line of symmetry.

5. Wheel suspension apparatus according to claim 1 wherein said vehicle has a longitudinal axis, a connecting straight line of the first and second body articulation points is inclined inwards in the driving direction at about 15° to the longitudinal axis of the vehicle.

6. Wheel suspension apparatus according to and as claimed in claim 1, 2, 3, 4, or 5, wherein said first suspension arm is arranged to be inclined upwards and backwards at an angle of about 15° in relation to a transverse plane through the vehicle or to said wheel axis.

7. Wheel suspension apparatus according to claim 1, wherein a said telescopic shock absorber and said spring forms a spring strut.

* * * * *